United States Patent
Nishida

(10) Patent No.: US 8,073,053 B2
(45) Date of Patent: Dec. 6, 2011

(54) IMAGE ENCODING DEVICE THAT ENCODES AN ARBITRARY NUMBER OF MOVING PICTURES

(75) Inventor: Hideshi Nishida, Hyogo (JP)

(73) Assignee: Panasonic Corporation, Osaka (JP)

( * ) Notice: Subject to any disclaimer, the term of this patent is extended or adjusted under 35 U.S.C. 154(b) by 1004 days.

(21) Appl. No.: 11/662,783

(22) PCT Filed: Sep. 5, 2005

(86) PCT No.: PCT/JP2005/016211
§ 371 (c)(1),
(2), (4) Date: Jan. 7, 2008

(87) PCT Pub. No.: WO2006/033227
PCT Pub. Date: Mar. 30, 2006

(65) Prior Publication Data
US 2008/0247461 A1    Oct. 9, 2008

(30) Foreign Application Priority Data
Sep. 22, 2004  (JP) .................................. 2004-275572

(51) Int. Cl.
*H04N 7/12* (2006.01)
(52) U.S. Cl. .............................. 375/240.12; 375/240.25
(58) Field of Classification Search ............. 375/240.02–240.23; 382/232–253
See application file for complete search history.

(56) References Cited

U.S. PATENT DOCUMENTS

| | | | |
|---|---|---|---|
| 5,144,428 A | 9/1992 | Okuda et al. | |
| 5,790,265 A * | 8/1998 | Shikakura | 358/426.09 |
| 5,805,220 A | 9/1998 | Keesman et al. | |
| 6,055,338 A * | 4/2000 | Endo et al. | 382/247 |
| 6,353,703 B1 | 3/2002 | Tatsumi et al. | |
| 6,577,769 B1 * | 6/2003 | Kenyon et al. | 382/239 |
| 6,980,694 B2 * | 12/2005 | Katayama | 382/233 |
| 2002/0037052 A1 | 3/2002 | Kimura et al. | |
| 2002/0118756 A1 | 8/2002 | Nakamura et al. | |
| 2003/0016753 A1 | 1/2003 | Kim et al. | |
| 2005/0088324 A1 * | 4/2005 | Fuchigami et al. | 341/107 |
| 2006/0104530 A1 * | 5/2006 | Smirnov | 382/245 |
| 2009/0073269 A1 * | 3/2009 | Yoshida et al. | 348/207.1 |

FOREIGN PATENT DOCUMENTS

| | | |
|---|---|---|
| JP | 4-98906 | 3/1992 |
| JP | 5-122681 | 5/1993 |
| JP | 9-23422 | 1/1997 |
| JP | 9-512417 | 12/1997 |
| JP | 10-304360 | 11/1998 |
| JP | 2000-184331 | 6/2000 |
| JP | 2001-103465 | 4/2001 |
| JP | 2001-211425 | 8/2001 |
| JP | 2001-346216 | 12/2001 |
| JP | 2002-034047 | 1/2002 |
| JP | 2003-102009 | 4/2003 |

* cited by examiner

*Primary Examiner* — Ayaz Sheikh
*Assistant Examiner* — Mounir Moutaouakil
(74) *Attorney, Agent, or Firm* — Wenderoth Lind & Ponack, L.L.P.

(57) ABSTRACT

An image encoding device encodes moving pictures, a moving picture count acquisition unit acquires a moving picture count of encoding target moving pictures corresponding to an arbitrary number of input moving pictures, a moving picture acquisition unit acquires one or plural encoding target moving pictures, a processing method designation unit, in accordance with the acquired count, designates processing methods relating to encoding processing that affect a computation amount, and an encoding processing unit performs encoding processing with respect to the acquired one or plural moving pictures, using time division when the plural moving pictures are plural. The encoding unit performs encoding processing using the designated methods.

20 Claims, 8 Drawing Sheets

FIG.2

MOTION ESTIMATION PROCESSING METHOD TABLE 50

| | 1 | 2 | 3 | ... |
|---|---|---|---|---|
| MOVING PICTURE COUNT 51 | | | | |
| REFERENCE IMAGE FRAME COUNT UPPER LIMIT 52 | 2 | 1 | 1 | |
| REFERENCE IMAGE BLOCK SEARCH RANGE 53 | −15 TO +15 | −15 TO +15 | −7 TO +7 | |
| SEARCH PATTERN 54 | 16×16<br>16×8<br>8×16<br>8×8<br>8×4<br>4×8<br>4×4 | 16×16<br>16×8<br>8×16<br>8×8 | 16×16<br>8×8 | ... |

FIG.3

INTRA-ENCODING PROCESSING METHOD TABLE 60

| MOVING PICTURE COUNT | 1 | 2 | 3 | ... |
|---|---|---|---|---|
| ESTIMATION DIRECTION | 8 (ESTIMATION MODE 0-7) | 5 (ESTIMATION MODE 0-4) | 3 (ESTIMATION MODE 0-2) | |
| ... | | | | |

61
62

IMAGE ENCODING DEVICE THAT ENCODES AN ARBITRARY NUMBER OF MOVING PICTURES

BACKGROUND OF THE INVENTION

1. Technical Field

The present invention relates to a technique for compression encoding a moving picture, and in particular to an image encoding device that compression encodes a plurality of moving pictures.

2. Background Art

Conventionally known standards for compression encoding (hereinafter simply referred to as encoding) used when transmitting a moving picture or recording a moving picture to a recording medium include MPEG (Moving Picture Experts Group) standards such as the MPEG 2 video standard (ISO/IEC 18818-2), the MPEG 4 visual standard (ISO/IEC 14496-2), and the MPEG 4 AVC standard (Moving Picture Experts Group phase 4 Advanced Video Coding, ISO 14496-10). Image encoding devices that conform to these standards are being developed.

One image encoding device that encodes a plurality of moving pictures in parallel is proposed in Japanese Patent Document 1. This image encoding device has a plurality of encoding processing units, each of which includes a frequency converter, a quantizer, and a variable length encoder. The image encoding device controls the output bitrate of each encoded moving pictures so as to maintain a constant overall bitrate in accordance with network transmission demands.

In this conventional image encoding device that encodes a plurality of moving pictures in parallel, an input moving picture is converted from a spatial domain to a frequency domain by a frequency converter, further quantized in accordance with quantization coefficients by a quantizer, and converted to variable length code and output by a variable length encoder. The image encoding device controls the output bitrate by performing quantization using quantization coefficients determined in accordance with a total value of the complexity of each of an input first moving picture and second moving picture.

Japanese Patent Document: Japanese Translation of PCT International Publication No. H09-512417

Since the aforementioned image encoding device that encodes a plurality of moving pictures in parallel has as many encoding units as the number of input moving pictures, it is suitable for situations where there is a constant number of input moving pictures.

However, an image encoding device is not necessarily used in a situation where the number of input moving pictures is always the same. For instance, a possible situation is one in which the image encoding device is part of a television broadcast receiver, and an arbitrary number of moving pictures that are selected by a user from among moving pictures broadcast on a plurality of channels are received in parallel to be subjected to encoding processing and stored in a compressed state to a recording medium such as an optical disc.

In order to deal with a situation where the number of input moving pictures is not necessarily always the same, the described conventional image encoding device is equipped with an equivalent number of encoding units to the maximum number of moving pictures permitted to be input. However, when the number of moving pictures selected by the user for input is less than the maximum number, some of the encoding units are unused and therefore redundant. This is undesirable in terms of effective usage of the internal circuits of the image encoding device.

The present invention was conceived in view of this problem, and has an object of providing an image encoding device that performs encoding processing in a manner that deals with an input of an arbitrary number of moving pictures and utilizes a limited number of encoding units effectively.

SUMMARY OF THE INVENTION

In order to solve the stated problem, an image encoding device of the present invention is an image encoding device that performs encoding processing that is for compressing one or more moving pictures and includes motion estimation processing, including: a moving picture count acquisition unit operable to acquire a moving picture count that shows how many moving pictures are an encoding target; a moving picture acquisition unit operable to acquire one or plural moving pictures that are the encoding target; a motion estimation processing method designation unit operable to designate, in accordance with the acquired moving picture count, a motion estimation processing method that affects a computation amount in the motion estimation processing, such that the greater the moving picture count is, the smaller the computation amount is; and an encoding unit operable to perform encoding processing with respect to the acquired one or plural moving pictures, and in a case that the plural moving pictures are acquired, perform the encoding processing by time division, wherein the encoding unit includes a motion estimation sub-unit operable to perform, as part of the encoding processing, motion estimation processing using the designated motion estimation processing method.

Here, computation amount means the processing amount for encoding processing per one moving picture by a circuit in charge of encoding processing, and the computation amount being great means that a relatively long amount of time is taken to complete processing.

In the case that the circuit in charge of encoding processing implements encoding processing according to a processor that executes software, computation amount means the number of computation instructions for implementing the encoding processing, or the time taken to execute the instructions.

According to the stated structure, the image encoding device of the present invention is able to perform encoding processing in a manner that adapts to input of an arbitrary number of moving pictures and utilizes the encoding unit effectively, by adjusting the encoding amount required from encoding processing in accordance with the number of moving pictures to be encoded in parallel.

More specifically, the image encoding device of the present invention reduces the computation amount required per moving picture for motion estimation processing when the number of moving pictures to be encoded is relatively large. For instance, the computation amount required to encode one moving picture and the total computation amount required to encode a plurality of moving pictures can be kept to approximately the same level. Note that in practice the motion estimation processing requires a large computation amount compared to other processing in the encoding processing, and that reducing the computation amount for motion estimation processing contributes significantly to the reduction of the computation amount of encoding processing.

Therefore, although the reduction of the encoding amount may adversely affect the compression rate and/or the picture quality, the image encoding device of the present invention is able to simultaneously encode any number of encoding target moving pictures without any particular increase in the cost, and provides a benefit that, to an extent, encoding of all of the moving pictures can be completed with in a same time period.

One example of how the picture quality can be prevented from being adversely affected is to employ a method that reduces the quantization step size for quantization processing in the encoding processing.

Furthermore, the motion estimation processing designation unit may (a) include a storage sub-unit operable to store in advance a table that associates a plurality of moving picture count values and parameters for designating the motion estimation processing method, the moving picture count values and the parameters being associated so as to have a relationship whereby the greater the moving picture count is, the less the computation amount of the motion estimation processing is, and (b) designate the motion estimation processing method by transferring, to the motion estimation sub-unit, a parameter that, among the parameters in the table, corresponds to the acquired moving picture count, and the motion estimation sub-unit may perform the motion estimation processing using the designated motion estimation processing method, based on the parameter transferred from the motion estimation processing method designation unit.

According to the stated structure, the motion estimation processing method is determined using a table that has been appropriately set in advance by experiments or the like. Therefore, it is possible change the motion estimation processing method in accordance with number of coding target moving pictures quicker and more appropriately than if the motion estimation processing method was designated as necessary by performing calculation processing or the like. If the table is set such that the total computation amount required for motion estimation processing for each moving picture is approximately within a set range, encoding of the moving pictures can be performed suitably in parallel even in the case of two or three encoding target moving pictures.

Furthermore, the motion estimation processing designation unit may designate, in accordance with the acquired moving picture count, the motion estimation processing method in relation to an upper limit value of a total number of reference image frames in motion estimation processing, such that the greater the moving picture count is, the smaller the upper limit value of the total number of reference frames is, and the motion estimation sub-unit, in the motion estimation processing may perform, with respect to each of processing target blocks in each of image frames that are a target of the motion estimation processing, a search for a motion vector in a total number of reference image frames that is no greater than the upper limit value in the designated motion estimation processing method.

A moving picture is composed of a plurality of image frames, and each image frame is divided into a plurality of processing target blocks for motion estimation processing. The motion estimation processing is processing that, with respect to each processing target block, searches one or more reference frames for a highly similar reference image block to find a motion vector indicating the location of the reference image block, and finds difference data that is the difference between the image data of the processing target block and the image data of the reference image block. The found data is used in subsequent stages of the encoding processing.

Furthermore, in motion estimation processing, by limiting in the number of reference image frames where reference image blocks are located are limited for each of the moving pictures in the case of a relatively large number of encoding target moving pictures, the image encoding device of the present invention reduces the computation amount for searching for a highly similar block to a processing target block in image frames. As a result, the limited computation processing capability of the image encoding device can be used effectively, and an arbitrary number of moving pictures can be encoded simultaneously.

Furthermore, the motion estimation processing method designation unit may designate, in accordance with the acquired moving picture count, the motion estimation processing method in relation to a motion vector search range in the motion estimation search processing, such that the greater the moving picture count is, the smaller the search range is, and the motion estimation sub-unit, with respect to each of processing target blocks in each of image frames that are a target of the motion estimation processing, may search within the search range in the designated motion estimation processing method for a reference image block that is similar to said processing target block, and determine a motion vector that indicates said reference image block.

According to the stated structure, when there is a relatively large number of encoding target moving pictures, the reference image block search range in motion estimation processing of each of the moving pictures is reduced. This cuts the computation amount for searching for a reference image block, and enables an arbitrary number of moving pictures to be encoded simultaneously.

Furthermore, the motion estimation processing method designation unit may designate, in accordance with the acquired moving picture count, the motion estimation processing method in relation to shape patterns of reference image blocks in motion estimation processing, such that the greater the moving picture count is, the fewer the shape patterns are, and the motion estimation unit, with respect to each of processing target blocks in each of image frames that are a target of the motion estimation processing, may use the shape patterns in the designated motion estimation processing method to search for a reference image block similar to said processing target block, and determines a motion vector that indicates said reference image block.

According to the stated structure, if the number of moving pictures is relatively large, the number of shape patterns used for comparison when searching for references blocks in motion estimation processing for each moving picture is reduced. This cuts the computation amount for searching for reference image blocks, and enables an arbitrary number of moving pictures to be encoded simultaneously.

Here, the moving picture acquisition unit may acquire a new moving picture while the encoding unit is performing the encoding, the moving picture count acquisition unit may newly acquire the moving picture count while the encoding unit is performing the encoding, and the motion estimation processing designation unit may newly designate the motion estimation processing method each time the moving picture count acquisition unit newly acquires the moving picture count.

According to the stated structure, even if the number of moving pictures input into the image encoding device changes, a motion estimation processing method can be newly designated in accordance with the new moving picture count, and motion estimation processing can be performed according to the newly designated method. This means that the new number of moving pictures can be encoded suitably.

Furthermore, the moving picture acquisition unit may acquire the plural moving pictures that are encoding targets, and the image encoding device may further include: a reception unit operable to receive, from an external device that is capable of executing encoding processing, capability information that shows computation processing capability of the external device; a determination unit operable to determine, based on the capability information, a moving picture count of encoding target moving pictures whose encoding is to be delegated to the external device, from among the acquired moving pictures; and a transmission unit operable to transmit, from among the acquired moving pictures, moving pictures equivalent in number to the moving picture count determined by the determination unit, wherein the motion estimation processing method designation unit designates the motion estimation processing method in accordance with a difference between the moving picture count acquired by the moving picture count acquisition unit and the moving picture count determined by the determination unit, such that the greater the difference is, the less the computation amount is.

Furthermore, the determination unit, based on the capability information, may determine a motion estimation processing method to be used in encoding processing that is delegated to the external device, in addition to determining the moving picture count of moving pictures whose encoding is to be delegated to the external device, and the transmission unit may further transmit, to the external device, information showing the motion estimation processing method determined by the determination unit.

According to the stated structure, processing can be performed by distributing encoding of a plurality of moving pictures between a plurality of devices.

Furthermore, the image encoding device may further include: a quantization step size designation unit operable to designate a quantization step size in accordance with the acquired moving picture count, such that the greater the moving picture count is, the smaller the quantization step size is, wherein the encoding unit includes a quantization sub-unit operable to perform quantization using the determined quantization step size to quantize difference data obtained as a result of the motion estimation processing.

According to the stated structure, the quantization size step used in quantization in encoding processing can be made smaller to improve picture quality, so as to interpolate a drop in picture quality that occurs as a result of reducing the computation amount of motion estimation processing with respect to each moving picture as the number of encoding target moving pictures increases.

Furthermore, an image encoding device of the present invention is an image encoding device that performs encoding processing for compressing one or more moving pictures, including: a moving picture count acquisition unit operable to acquire a moving picture count that shows how many moving pictures are an encoding target; a moving picture acquisition unit operable to acquire one or plural moving pictures that are the encoding target; a processing method designation unit operable to designate, in accordance with the acquired moving picture count, an encoding processing method that affects a computation amount in the encoding processing, such that the greater the moving picture count is, the smaller the computation amount is; and an encoding unit operable to perform the encoding processing with respect to the acquired one or plural moving pictures using the designated encoding processing method, and in a case that the plural moving picture being acquired, perform the encoding processing by time division.

According to the image encoding device of the present invention, the computation amount required for encoding processing for each moving picture is adjusted according to the number of moving pictures to be encoded in parallel. Therefore, the encoding unit can be used effectively when encoding an arbitrary number of moving pictures simultaneously.

Furthermore, the processing method designation unit may (a) include a storage sub-unit operable to store in advance a table that associates a plurality of moving picture count values and parameters for designating the encoding processing method, the moving picture count values and the parameters being associated so as to have a relationship whereby the greater the moving picture count is, the less the computation amount of the encoding processing is, and (b) designate the encoding processing method by transferring, to the encoding unit, a parameter that, among the parameters in the table, corresponds to the acquired moving picture count, and the encoding unit may perform the encoding processing using the designated encoding processing method, based on the parameter transferred from the processing method designation unit.

According to the stated structure, the encoding processing method is determined using a table that as been appropriately set in advance by experiments or the like. Therefore, it is possible change the encoding processing method in accordance with the number of encoding target moving pictures quicker and more appropriately than if the encoding processing method was designated by performing calculation processing or the like as necessary. If the table is set such that the total computation amount required for encoding processing for each moving picture is approximately within a set range, encoding of the moving pictures can be performed suitably in parallel even in the case of two or three encoding target moving pictures.

Furthermore, the encoding unit may include an intra-encoding sub-unit operable to perform, as part of the encoding processing, image intra-frame encoding processing with respect to some or all image frames of the moving pictures that are the encoding target, the processing method designation unit may designate, in accordance with the acquired moving picture count, the processing method in relation to directions in which to search for an estimation value in image intra-frame encoding, such that the greater the moving picture count is, the fewer the search directions are, and the intra-encoding specification unit, with respect to each of processing target blocks in an image frame, may search in each direction in the designated encoding processing method to search for an estimation value that is most similar to image data of said processing target block.

Here, the intra-image frame encoding processing is intra-encoding processing for finding an estimation value most similar to the image data of the processing target block, among estimation values calculated based on blocks in predetermined directions in the same image frame as the processing target block, and calculating difference data that is the difference between the found estimation value and the image data of the processing target block. The found data is used in subsequent stages of the encoding processing.

According to the stated structure, when the number of encoding target moving pictures is relatively large, the calculation target range for calculating the estimation value in the intra-encoding of each moving picture is decreased, thereby reducing the computation amount. This enables an arbitrary number of moving pictures to be encoded simultaneously.

Furthermore, the processing method designation unit may designate, in accordance with the acquired moving picture count, the encoding processing method in relation to whether or not to use inter-image frame encoding, such that inter-image frame encoding is used if the acquired moving picture count is fewer than a predetermined moving picture count, and inter-image frame encoding is not used if the acquired moving picture count is equal to or greater than the predetermined moving picture count, the encoding unit may (a) perform inter-image frame encoding and intra-image frame encoding with respect to the moving pictures if the designated encoding processing method is the encoding processing method that uses inter-frame encoding, and (b) perform intra-image frame encoding with respect to the moving pictures, without performing inter-image frame encoding, if the designated encoding processing method is the encoding processing method that does not use inter-image frame encoding.

According to the stated structure, only intra-frame encoding is performed when the moving picture count is relatively large, and therefore the computation amount is reduced. This enables an arbitrary number of moving pictures to be encoded simultaneously.

Furthermore, the encoding unit may include a variable length encoding sub-unit operable to perform variable length encoding as part of the encoding processing, the processing method designation unit may designate, in accordance with the acquired moving picture count, a variable length processing method such that arithmetic coding is used if the acquired moving picture count is fewer than the predetermined moving picture count, and arithmetic coding is not used if the acquired moving picture count is equal to or greater than the predetermined moving picture count, and the variable length encoding sub-unit may (a) perform the variable length encoding using arithmetic coding if the designated variable length encoding method is the variable length encoding method that uses arithmetic coding, and (b) perform the variable length encoding using a comparative table of predetermined code words, without using arithmetic coding, if the designated variable length encoding method is the variable length encoding method that does not use arithmetic coding.

According to the stated structure, when the moving picture count is relatively large, variable length encoding can be performed based on a table without using arithmetic code which generally requires a large amount of computation. This enables an arbitrary number of moving pictures to be encoded simultaneously.

Furthermore, the moving picture acquisition unit may acquire a new moving picture while the encoding unit is performing the encoding, the moving picture count acquisition unit may newly acquire the moving picture count while the encoding unit is performing the encoding, and the processing method designation unit may newly designate the encoding processing method each time the moving picture count acquisition unit newly acquires the moving picture count.

According to the stated structure, even if the number of moving pictures input into the image encoding device changes, a motion estimation processing method can be newly designated in accordance with the new moving picture count, and motion estimation processing can be performed according to the newly designated method. This means that the new number of moving pictures can be encoded suitably.

Furthermore, the moving picture acquisition unit may acquire the plural moving pictures that are encoding targets, and the image encoding device may further include: a reception unit operable to receive, from an external device that is capable of executing encoding processing, capability information that shows computation processing capability of the external device; a determination unit operable to determine, based on the capability information, a moving picture count of moving pictures whose encoding is to be delegated to the external device, from among the acquired moving pictures; and a transmission unit operable to transmit, from among the acquired moving pictures, moving pictures equivalent in number to the moving picture count determined by the determination unit, wherein the processing method designation unit designates the encoding processing method in accordance with a difference between the moving picture count acquired by the moving picture count acquisition unit and the moving picture count determined by the determination unit, such that the greater the difference is, the less the computation amount is.

According to the stated structure, processing can be performed by distributing encoding of a plurality of moving pictures between a plurality of devices.

Furthermore, the image encoding device may further include: a picture quality information acquisition unit operable to acquire picture quality information showing a requested picture quality, wherein the processing method designation unit designates the encoding processing method in accordance with the acquired motion picture count and the acquired picture quality information.

When, for instance, a high picture quality is requested, the quantization step size is made smaller in order to respond to this request, and therefore encoding can be performed in accordance with the requested picture quality.

Furthermore, the image encoding device may further include: a decoding unit operable to decode a compressed moving picture, using part of circuits of the encoding unit, wherein the processing method designation unit designates the encoding processing method further in accordance with an amount of the moving picture to be decoded by the decoding unit, such that the greater the amount of the moving picture is, the less the computation amount is.

According to the stated structure, encoding of an arbitrary number of moving pictures can be performed in parallel with decoding of moving pictures.

Furthermore, an image encoding method of the present invention is an image encoding method that performs encoding processing that is for compressing one or more moving pictures and includes motion estimation processing, including: a moving picture count acquisition step of acquiring a moving picture count that shows how many moving pictures are an encoding target; a moving picture acquisition step of acquiring one or plural moving pictures that are the encoding target; a motion estimation processing method designation step of designating, in accordance with the acquired moving picture count, a motion estimation processing method that affects a computation amount in the motion estimation processing, such that the greater the moving picture count is, the smaller the computation amount is; and an encoding step of performing encoding processing with respect to the acquired one or plural moving pictures, and in a case that the plural moving pictures are acquired, performing the encoding processing by time division, wherein the encoding step includes a motion estimation sub-step of performing, as part of the encoding processing, motion estimation processing using the designated motion estimation processing method.

Furthermore, an image encoding method of the present invention is an image encoding method that performs encoding processing for compressing one or more moving pictures, including: a moving picture count acquisition step of acquiring a moving picture count that shows how many moving pictures are an encoding target; a moving picture acquisition step of acquiring one or plural moving pictures that are the encoding target; a processing method designation step of designating, in accordance with the acquired moving picture count, an encoding processing method that affects a computation amount in the encoding processing, such that the greater the moving picture count is, the smaller the computation amount is; and an encoding step of performing the encoding processing with respect to the acquired one or plural moving pictures using the designated encoding processing method, and in a case that the plural moving pictures are acquired, performing the encoding processing by time division.

According to the stated image encoding methods, the computation amount required for encoding processing can be adjusted in accordance the number of moving pictures to be encoded in parallel. Therefore, an arbitrary number of moving pictures can be encoded according to encoding processing whose computation amount is within approximately a same range.

BRIEF DESCRIPTION OF THE DRAWINGS

FIG. 2 shows an example of the structure and contents of a motion estimation processing method table;

FIG. 3 shows an example of the structure and content of an intra-encoding processing method table;

Figure 1:
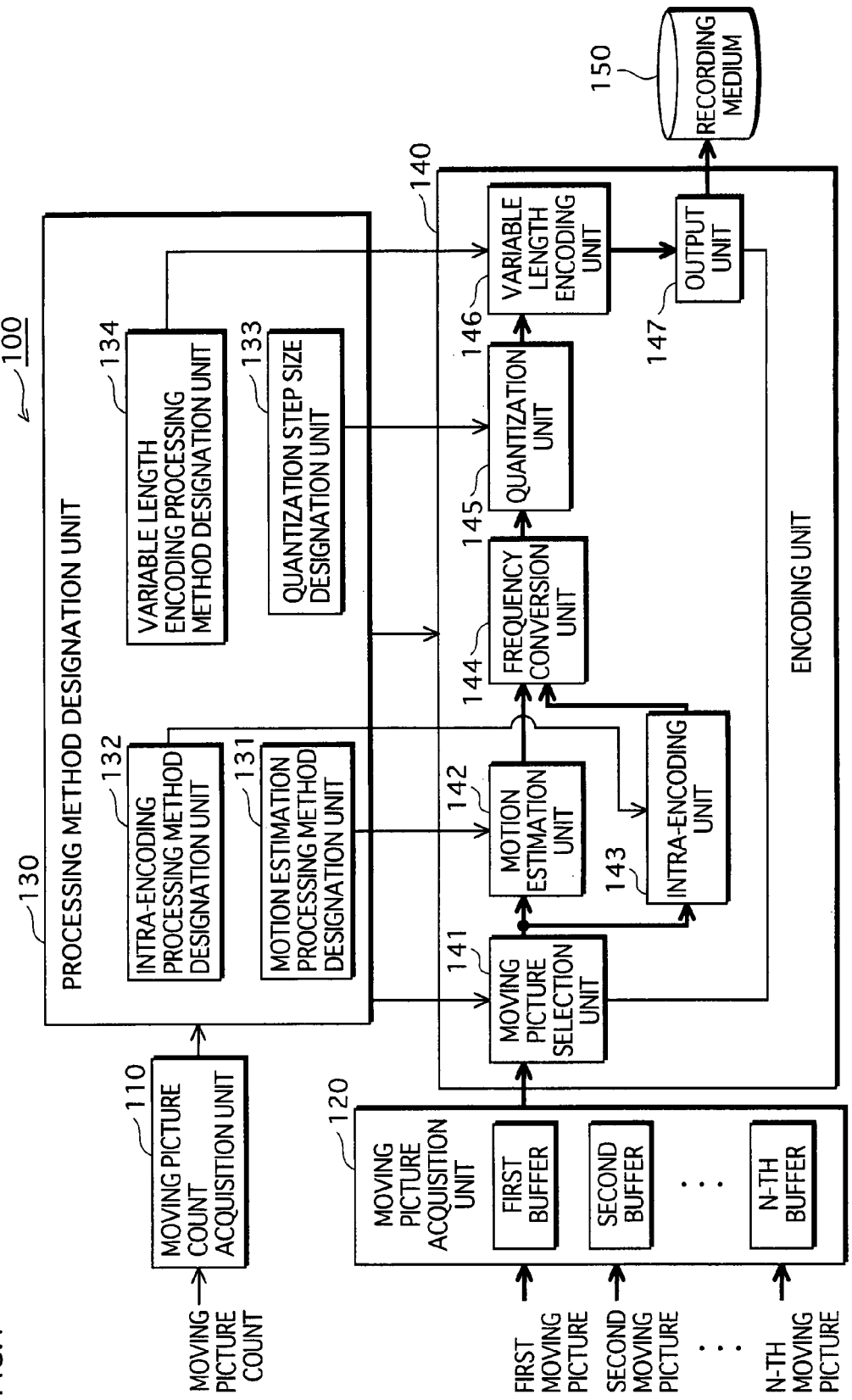
FIG. 1 is a structural diagram of an image encoding device 100 of the first embodiment of the present invention.

DESCRIPTION OF NUMERICAL REFERENCES 100, 200, 300, 400 Image encoding device
110 Moving picture count acquisition unit
120 Moving picture acquisition unit
130, 230 Processing method designation unit
131 Motion estimation processing method designation unit
132 Intra-encoding processing method designation unit
133, 233 Quantization step size designation unit
134 Variable length encoding processing method designation unit
140 Encoding unit
141 Moving picture selection unit
142 Motion estimation unit
143 Intra-encoding unit
144 Frequency conversion unit
145 Quantization unit
146 Variable length encoding unit
147 Output unit
150 Recording medium
211 Picture quality acquisition unit
301, 402 Processing amount management unit

DETAILED DESCRIPTION OF THE INVENTION

<First Embodiment>

The following describes an image encoding device 100 of a first embodiment of the present invention.
<Structure>
FIG. 1 is a structural diagram of the image encoding device 100 of the first embodiment of the present invention.

The image encoding device 100, as shown in FIG. 1, includes a moving picture count acquisition unit 110, a moving picture acquisition unit 120, a processing method designation unit 130 and an encoding unit 140.

FIG. 1 shows a recording medium 150 for storing data that results from one or more moving pictures being subjected to encoding processing and output by the image encoding device 100. As one example, the recording medium 150 is an optical disc. It should be noted that here the term moving picture refers to moving picture data that includes image frames that express the contents of images displayed when the moving picture data is played back.

The moving picture count acquisition unit 110 is an input interface that receives a moving picture count from a source external to the image encoding device 100 and transfers the moving picture count to the processing method designation unit 130. The moving picture count shows how many moving pictures are a target of encoding.

The moving picture acquisition unit 120 is a moving picture input interface, and has a plurality of buffer memories, here referred to as a first buffer, a second buffer, . . . , n-th buffer, each of which has a capacity sufficient to store a predetermined number of image frames that compose a moving picture. The moving picture acquisition unit 120 has a function of receiving input of one or a plurality of moving pictures that are an encoding target from a source external to the image encoding device 100, and storing each of the moving pictures in a different one of the internal buffer memories. Given that the moving pictures are stream data, when the total data amount of a moving picture is relatively large, the moving picture acquisition unit 120 may continue to acquire the moving picture while the image encoding device 100 is encoding an already-acquired part of the moving picture.

The processing method designation unit 130 is realized by a memory and a processor, and as functional components, includes a motion compensation processing method designation unit 131, an intra-encoding processing method designation unit 132, a quantization step size designation unit 133 and a variable length encoding processing method designation unit 134. The processing method designation unit 130 has a function of designating, in accordance with the moving picture count transferred from the moving picture count acquisition unit 110, the encoding processing method to be used by the encoding unit 140, and transferring a parameter showing the designated processing method to the encoding unit 140.

The encoding unit 140 is realized by a memory, groups of circuits that perform respective parts of the encoding processing, and a control processor that controls the circuit groups. The encoding unit 140 includes a moving picture selection unit 141, a motion estimation unit 142, an intra-encoding unit 143, a frequency conversion unit 144, a quantization unit 145, a variable length encoding unit 146, and an output unit 147, and has a function of reading a moving picture from a buffer memory of the moving picture acquisition unit 120, encoding the moving picture, and recording the encoded moving picture to the recording medium 150. Note that encoding is described based on the premise of conforming to the MPEG4AVC standard.

The motion estimation processing method designation unit 131 of the processing designation unit 130 has a motion estimation processing method table that is one area in the memory, and has a function of designating the motion estimation processing method to be used by the motion estimation unit 142, based on the motion estimation processing method table and in accordance with the moving picture count transferred from the moving picture count acquisition unit 110. The motion estimation method table is described in detail later.

The intra-encoding processing method designation unit 132 has an intra-encoding processing method table that is an area in the memory, and has a of function of designating the intra-encoding processing method to be performed by the intra-encoding unit 143, based on the intra-encoding processing method table and in accordance with the moving picture count transferred from the moving picture count acquisition unit 110. The intra-encoding method table is described in detail later.

The quantization step size designation unit 133 has a function of calculating the quantization step size to be used for quantization in the quantization unit 145, by performing a predetermined computation based on the moving picture count transferred from the moving picture count acquisition unit 110. The predetermined computation is a computation determined in advance such that the greater the moving picture count is, the smaller the quantization step size is, and such that when the moving picture count is "1", the quantization step size is substantially equivalent to conventional image encoding devices in actual use.

The variable length encoding processing designation unit 134 has a function of designating a variable length processing method based on the moving picture count transferred from the moving picture count acquisition unit 110.

More specifically, this function is a function of designating which of two methods is to be used. One of these is a method of performing encoding based on a comparative table of events and code words provided in advance on the basis of anticipated statistical quantities of events to be variable length encoded. The other of the methods is a method called arithmetic coding, and in order to further increase the compression rate, with this method arithmetic calculations based on a probability of occurrence of events in the past are used to determine code words dynamically while encoding is carried out.

The moving picture selection unit 141 of the encoding unit 140 is a circuit that has a function of acquiring the moving picture count via the processing method designation unit 130; in accordance with the acquired moving picture count, reading the moving pictures in turn at each instance of a predetermined time interval, from a number of buffer memories in the moving picture acquisition unit 120 equivalent to the acquired moving picture count; and, treating each moving picture as a succession of digitized image frames, transferring the image frames that compose each moving picture to the motion estimation unit 142 or the intra-encoding unit 143 so as to start encoding processing of the moving pictures by time division.

This processing according to time division is implemented as follows. Taking an example here of the moving picture count being two, the moving picture selection unit 141 alternates one image frame at a time between the two moving pictures read from the buffer memory, and successively transfers each image frame one block unit at a time to the motion estimation unit 142 or the intra-encoding unit 143. Note that each block unit is of a predetermined size, one example being a macroblock unit.

The motion estimation unit 142 is a circuit that is able to access the buffer memories storing the moving pictures in the moving picture acquisition unit 120, and has a function of receiving a parameter showing a designated motion estimation processing method from the motion estimation processing method designation unit 131, and executing motion estimation processing in block units of a predetermined size for each image frame of the moving picture selected by the moving picture selection unit 141.

The motion estimation processing is inter-image frame encoding, and this processing involves, with respect to each block (hereinafter called a "target processing block") in an image frame, searching another one or more image frames for a block (hereinafter called "reference image block(s)") that is highly similar to the target processing block, calculating a motion vector indicating the position of the reference image block, then calculating difference data that is a difference value between the image data of the processing target block and image data of the reference image block found as a result of the search, and transferring the difference data to the frequency conversion unit 144. Here, the image data of the processing target block and a reference image block being highly similar refers to the distribution tendencies of the two blocks being similar, and the similarity is highest when the image data of the two blocks is identical.

The intra-encoding unit 143 is a circuit that has a function of receiving a parameter showing a designated intra-encoding processing method from the intra-encoding processing designation unit 132, and in accordance with the designated intra-encoding processing method, subjecting an image frame of a moving picture selected by the moving picture selection unit 141 to intra-frame encoding processing in block units of a predetermined size.

The intra-frame encoding processing is intra-image frame processing, and involves, with respect to each block in an image frame, searching for a estimation value such that there is as greater similarity as possible between the image data of the block and an estimation value based on a proximate block in one of a predetermined number of directions in the same image frame, calculating difference data that is a difference value of the image data of the processing target block and the estimation value, and transferring the difference data to the frequency conversion unit 144.

The frequency conversion unit 144 is a circuit that has a function of applying orthogonal transformation to numerical values that compose the difference data transferred from the motion estimation unit 142 or the intra-encoding unit 143, by removing a spatial redundancy to make the numerical values relatively small, and transferring the resultant difference data of the orthogonal transformation to the quantization unit 145.

The quantization unit 145 has a function of acquiring the data resulting from the orthogonal transformation by the frequency conversion unit 144, and in order to make the numerical values that compose the difference data even smaller, subjecting the numerical values to quantization by dividing the numerical values with the quantization step size designated by the quantization step size designation unit 133 and rounding off resultant numerical values to integers, and then transferring the resultant data of the quantization to the variable length encoding unit 146.

The variable length encoding unit 146 is a circuit that has a function of obtaining the resultant data of the quantization by the quantization unit 145, subjecting the obtained data to variable length encoding using the processing method designated by the variable length encoding processing method designation unit 134, such that the data amount is further compressed by expressing information with code that is shorter the higher the appearance frequency of the information is, and transferring the resultant data of the variable length encoding to the output unit 147.

The output unit 147 is a circuit that has a function of distinguishing which moving picture the encoded data transferred from the variable length encoding unit 146 belongs to, and recording the encoded data accordingly to the recording medium 150.

<Data>

The following describes table data stored in the processing method designation unit 130.

FIG. 2 shows an example of the structure and contents of a motion estimation processing method table.

The motion estimation processing method table held by the motion estimation processing method designation unit 131, as shown in FIG. 2, associates moving picture counts 51, reference image frame count upper limits 52, reference image block search ranges 53, search patterns 54, and so on. Note that each of the moving picture counts 51 has a value from "1" to a predetermined number "N", one example of "N" being "4".

Here, each reference image frame count upper limit 52 shows a maximum permitted number of image frames that any one target processing block in an image frame can refer to in motion estimation processing.

Each reference image block search range 53 shows the extent of a search range that shows within what range, based on the position of the target processing block, a search can be made to find a reference image block that is highly similar to the processing target block.

Each search pattern 54 shows the size and shape of a processing target block and a reference image block. Specifically, each search pattern 54 shows which one or more of the following seven patterns to use to perform a reference image block search: a pattern equivalent to a width of 16 pixels a height of 16 pixels, a pattern equivalent to a width of 16 pixels*a height of 8 pixels, a pattern equivalent to a width of 8 pixels*a height of 16 pixels, a pattern equivalent to a width 8 pixels*a height of 8 pixels, a pattern equivalent to a width of 8 pixels*a height of 4 pixels, a pattern equivalent to a width of 4 pixels*a height of 8 pixels, and a pattern equivalent to a width of 4 pixels*a height of 4 pixels.

According to the exemplary motion estimation processing method table shown in FIG. 2, when the moving picture count is 1, the motion estimation processing method that can be designated is one in which the upper limit of reference image frames is 2, the search range of the reference image block is a range of −15 pixels to +15 pixels from the position of the processing target block, and, as the size and shape of the search patterns, all seven patterns can be applied. Furthermore, in the case of the moving picture count being 2, the motion estimation processing method that can designated is one in which the upper limit of reference image frames is 1, the search range of the reference image block is a range of −15 pixels to +15 pixels from the position of the processing target block, and, as the size and shape of the search patterns, four patterns can be applied, namely: the pattern of width 16 pixels*height 16 pixels, the pattern of width 16 pixels*height 8 pixels, the pattern of width 8 pixels*height 16 pixels, and the pattern of width 8 pixels*height 8 pixels.

FIG. 3 shows an example of the structure and content of the intra-encoding processing method table.

The intra-encoding processing method table held by the intra-encoding processing method designation unit 132, as shown in FIG. 3, is a table that associates moving picture counts 61, estimation direction 62, and so on. Note that each of the moving picture counts 61 has a value from "1" to a predetermined number "N", one example of "N" being "4".

Each the estimation direction 62 shows an upper limit of the number of directions in which a estimation value can be searched for any one block in a particular image frame. In the case of a block of width 4 pixels*height 4 pixels, this direction is one of the nine directions that are estimation mode 0 to estimation mode 8.

The estimation modes that the estimation directions 62 are selected from among are as follows. The estimation mode 0 determines a value of a block in an up direction from the estimation target block as the estimation value for the estimation target block. The estimation mode 1 determines a value of a block in a left direction with respect to the estimation target block as the estimation value for the estimation target block. The estimation mode 2 determines an average value of (i) a value of a block in an up direction with respect to the estimation target block and (ii) a value of a block in a left direction with respect to the estimation target block, as the estimation value for the estimation target block. The estimation mode 3 uses (i) a value of a block in an up direction with respect to the estimation target block and (ii) a value of a block in an up right direction with respect to the target reference image block, to determine an estimation value in a 45 degree direction with respect to the estimation target block. The estimation mode 4 uses (i) a value of a block in an up direction with respect to the target reference image block and (ii) a value of a block in a left direction with respect to the target reference value, to determine a estimation value in a 135-degree direction with respect to the estimation target block. The estimation mode 5 similarly determines a estimation value in an approximately 112-degree direction, the estimation mode 6 similarly determines a estimation value in an approximately 158-degree direction, the estimation mode 7 determines a estimation value in an approximately 68 degree direction, and the estimation mode 8 determines a estimation value in an approximately 203-degree direction.

According to the exemplary intra-encoding processing method table shown in FIG. 3, an intra-encoding processing method by which the nine directions pertaining to the estimation modes 0 to 8 are able to be applied can be designated when the moving picture count is 1, and an intra-encoding processing method by which the five directions pertaining to the estimation modes 0 to 4 are able to be applied can be designated when the moving picture count is 2.

<Operations>

The following describes operations of the image encoding device 100 having the described structure.

The image encoding device 100 receives one or more encoding target moving pictures and the moving picture count from an external source via an input interface, and in the processing method designation unit 130 executes the processing method designation processing for designating the processing method for encoding processing based on the moving picture count, and in the encoding unit 140, executes encoding processing with respect to each of the one or more moving pictures in accordance with the result of the processing method designation processing.

Figure 4:
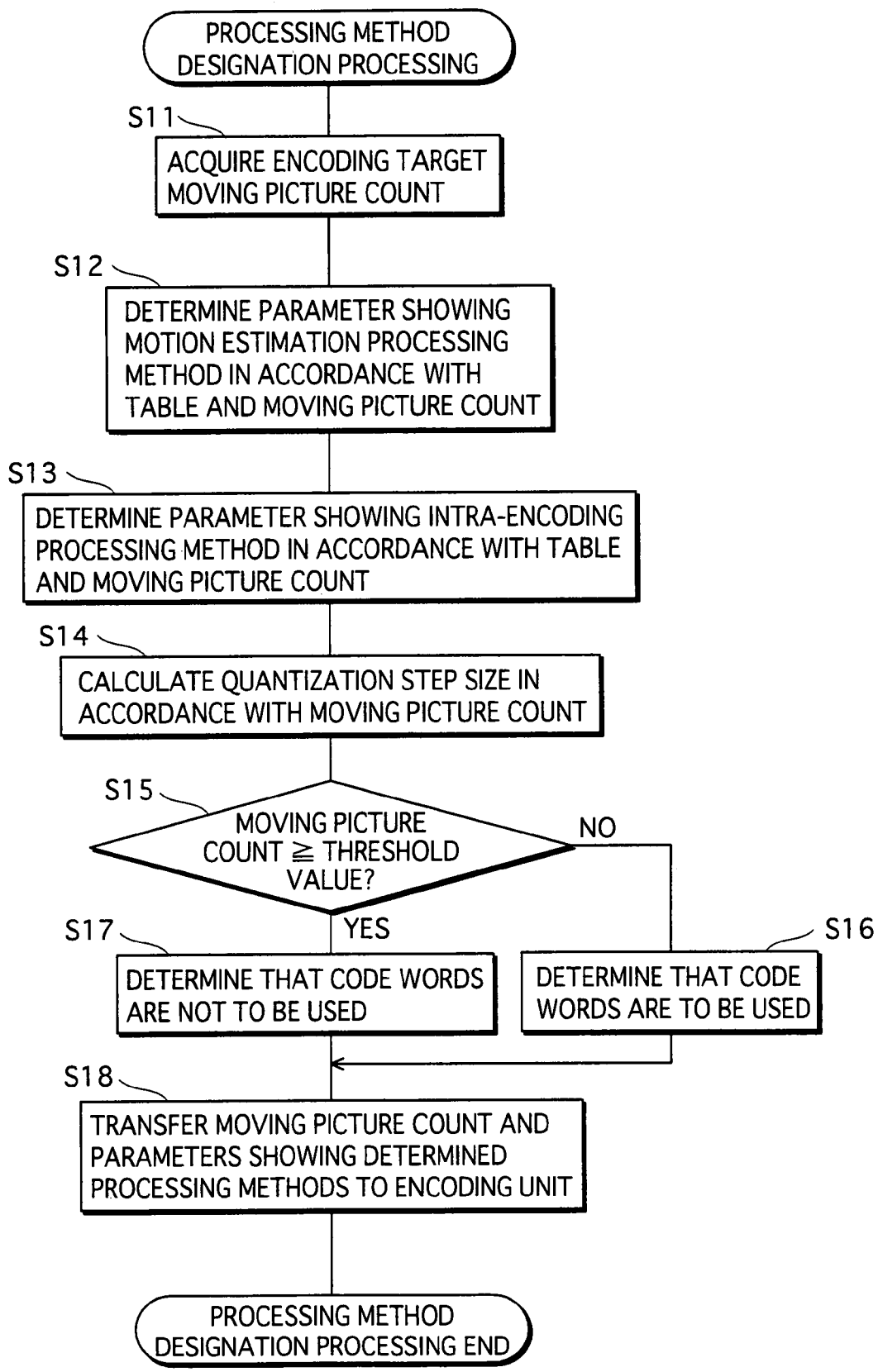
FIG. 4 is a flowchart showing the processing method designation processing performed by a processing method designation unit 130.

FIG. 4 is a flowchart showing the processing method designation processing performed by the processing method designation unit 130. The following describes the operations of the processing method designation unit 130 in accordance with FIG. 4.

The processing method designation unit 130 acquires the moving picture count showing the number of encoding target moving pictures from the moving picture count acquisition unit 110 (step S11). The processing method designation unit 130 then, in the motion estimation processing method designation unit 131, uses the motion estimation processing method table to designate parameters showing a motion estimation processing method in accordance with the moving picture count (step S12), and in the intra-encoding processing method designation unit 132, uses the intra-encoding processing method table to designate a parameter showing an intra-encoding processing method in accordance with the moving picture count (step S13).

The processing method designation unit 130 then calculates a quantization step size by the quantization step size designation unit 133 performing a predetermined computation in accordance with the moving picture count (step S14), and the variable length encoding processing method designation unit 134 compares the moving picture count with a predetermined threshold value set, for example, to "2" (step S15). If the moving picture count is less than the threshold value, the variable length encoding processing method designation unit 134 designates a parameter showing a variable length encoding method that uses arithmetic code (step S16), and if the moving picture count is equal to or greater than the threshold value, the processing method designation unit 130 designates a parameter showing a variable length encoding method that does not use arithmetic code (step S17). The processing method designation unit 130 then transfers the moving picture count, the parameters showing the motion estimation processing method, the quantization step size, and the parameter showing the variable length encoding processing method to the encoding unit 140 (step S18), and ends the processing method designation processing.

With such processing method designation processing, it is basically possible to designate the processing method such that the greater the moving picture count of encoding target moving pictures is, the lower the encoding processing amount is.

It should be note that the greater the encoding target moving picture count is, the smaller the quantization step size to be used in quantization is made. This results in a greater amount of processing for quantization. However, in contrast to motion estimation processing, the processing amount for quantization processing, for instance the computation amount when the processing is executed by a processor, is already sufficiently small for actual use. For this reason, the quantization step size can be made smaller so that quantization causes less of a drop in picture quality, and thereby compensates for the tendency for the picture quality to drop when, due to the processing amount of motion estimation processing being reduced by the processing method specification processing, the moving picture count increases.

Figure 5:
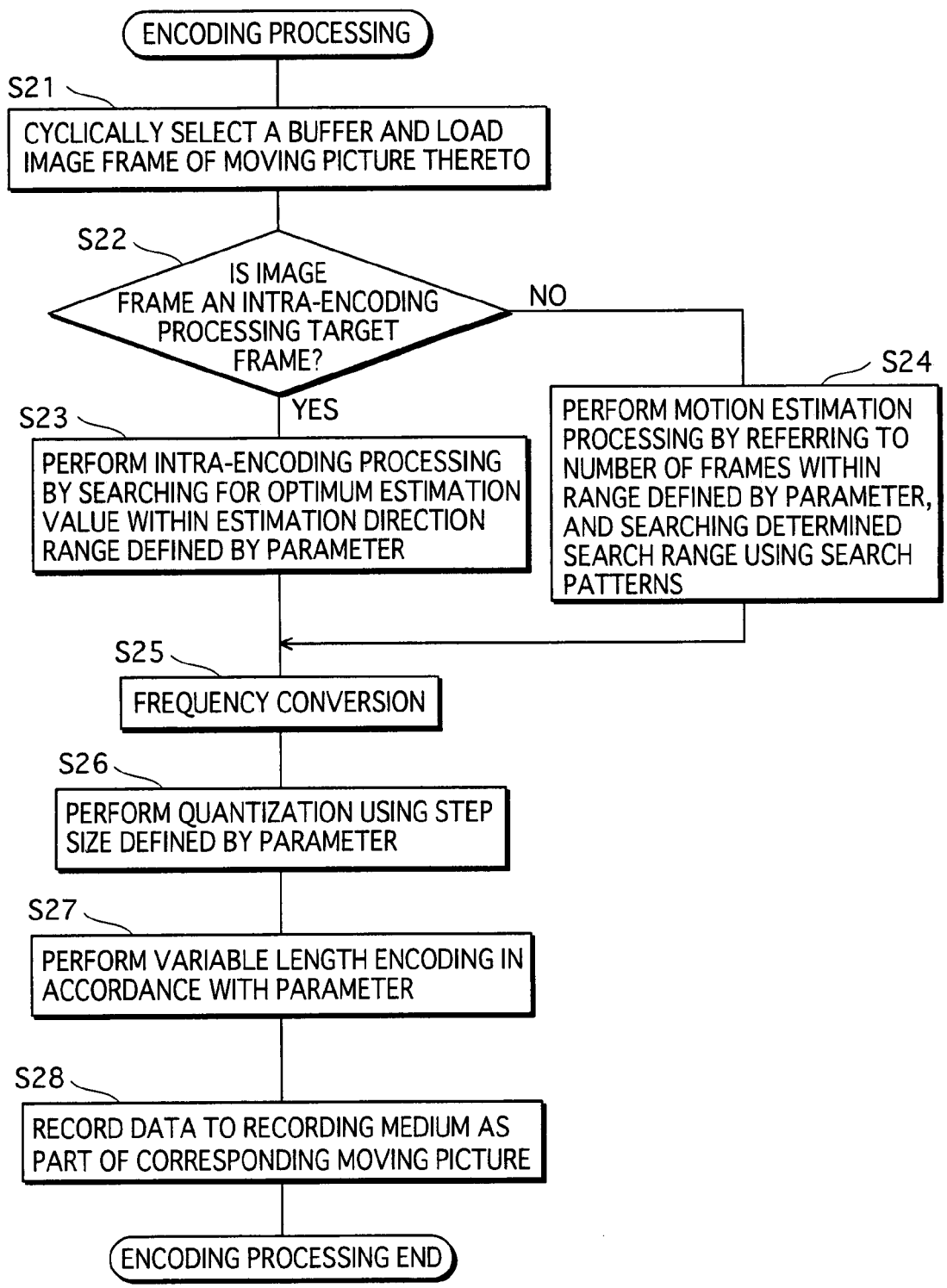
FIG. 5 is a flowchart showing encoding processing by an encoding unit 140.

FIG. 5 is a flowchart showing encoding processing by the encoding unit 140. The following describes operations of the encoding unit 140 in accordance with FIG. 5.

The moving picture selection unit 141 of the encoding unit 140, in accordance with the moving picture count transferred from the processing method designation unit 130, reads, from the buffer memories temporarily storing the moving pictures successively acquired by the moving picture acquisition unit 120 from an external source, the number of moving pictures shown by the transferred moving picture count, one image frame at a time by alternating successively between the moving pictures (step S21).

Next, in accordance with a predetermined judgment criterion, the encoding unit 140 determines whether a moving picture image frame read by the moving picture selection unit 141 is a target of intra-encoding processing only, or is potentially a target of motion estimation processing (step S22). When the image frame is a target of intra-encoding processing only, the intra-encoding unit 143 performs intra-encoding processing that consists of, with respect to each block in the image frame, searching for an optimal estimation value for the block within a range of estimation directions defined by the parameter designated by the intra-encoding processing method designation unit 132, and finding difference data that is a difference between the image data of the block and the estimation value (step S23).

When it is judged at step S22 that the image frame is not a target of intra-encoding processing only, the motion estimation unit 142 performs motion estimation processing. The motion estimation processing is performed as follows with respect to each processing target block in accordance with the parameter designated by the motion estimation processing method designation unit 131. With a total number of reference image frames that is no greater than the upper limit count shown by the parameter, the motion estimation unit 142 searches for a reference image block within the reference image block search range among the reference image frames shown by the parameter. Here, from among the search patterns for the processing target block, search patterns used to search for a reference image block are those defined by the shapes and sizes shown by the parameter. Using these search patterns, the motion estimation unit 142 searches for a reference image block highly-similar to the processing target block, calculates a motion vector that shows the position of the reference image block, and calculates difference data that is a difference between image data of the reference image block and image data of the target processing block (step S24).

Note that in the case of a reference image block being referenced from a plurality of image frames due to the parameter showing the reference image frame upper limit being 2 or greater, the difference data is found by finding the difference between (a) an average value of the image data of the reference image blocks found from the image frames and (b) the image data of the processing target block.

After step S23 or step S24, the frequency conversion unit 144 of the encoding unit 140 subjects the calculated difference data to orthogonal transformation (step S25), and the quantization unit 145 performs quantization of the resultant data using the quantization step size designated by the quantization step size designation unit 133 (step S26).

After quantization, the variable length encoding unit 146 subjects the data resulting from quantization to variable length encoding, either using or not using arithmetic code, depending on the parameter designated by the variable length encoding processing method designation unit 134 (step S27). The output unit 147 records the data resulting from the variable length encoding to the recording medium 150 in accordance with which moving picture the data belongs to (step S28). This ends the encoding processing (steps S22 to S28) of one image frame.

When the moving picture count is plural, in other words in the case of data showing a plural number being acquired by the moving picture count acquisition unit 110, encoding processing is executed with respect to another moving picture after the encoding processing with respect to an image frame in the first moving picture has been executed (step S22 to step S28). After encoding processing is executed successively for the number of moving pictures shown by the moving picture count, encoding processing is then commenced for the next image frame of each moving picture, starting again from the first moving picture. In this way, encoding processing is performed in turn for each moving picture.

In the case of data showing a single moving picture being acquired by the moving picture count acquisition unit 110, encoding processing is performed successively with respect to each of the image frames of the one moving picture. Note that each of the processes in the encoding processing shown in FIG. 5 (steps S22 to S28) is implemented in block units by pipeline processing.

MODIFICATION EXAMPLE

The following describes an image encoding device 200 that is a modification example of the image encoding device 100.

The image encoding device 200 is the image encoding device 100 with the addition of a function of receiving input of a requested picture quality from an external source, and encoding so as to maintain a picture quality corresponding to the request.

Figure 6:
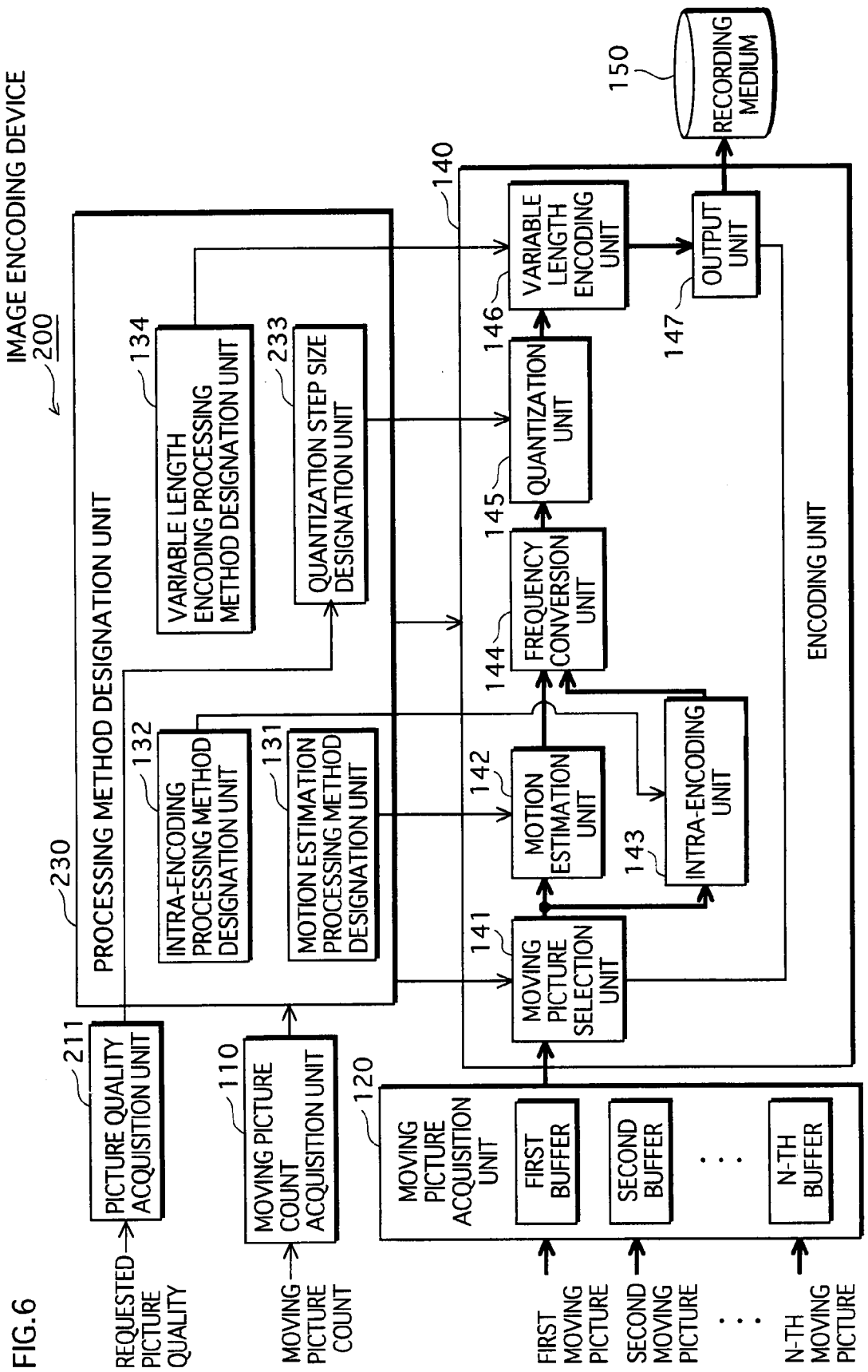
FIG. 6 is a structural diagram of an images encoding device 200.

FIG. 6 is a structural diagram of the image encoding device 200.

The image encoding device 200, as shown in FIG. 6, includes a picture quality acquisition unit 211, the moving picture count acquisition unit 110, the moving picture acquisition unit 120, a processing method designation unit 230, and the encoding unit 140. The compositional elements of the image encoding device 200 that are identical to those of the image encoding device 100 are given the same numerical references in FIG. 6 as FIG. 1, and a detailed description thereof is omitted.

The picture quality acquisition unit 211 is an input interface that has a function of acquiring picture quality information showing a picture quality input by a user or the like, and transferring the acquired picture quality information to the processing method designation unit 230. The picture quality information is, for instance, numerical value information that includes a numerical value that expresses how high the picture quality is to be.

The processing method designation unit 230 is composed of a motion estimation processing method designation unit 131, an intra-encoding processing method designation unit 132, a quantization step size designation unit 233 and a variable length encoding processing method designation unit 134.

The quantization size designation unit 233 has a function of calculating the quantization step size to be used for quantization in the quantization unit 145, by performing a predetermined computation based on the moving picture count transferred from the moving picture count acquisition unit 110 and the picture quality information transferred from the picture quality acquisition unit 211. The predetermined computation is set such that the greater the moving picture count, the smaller the quantization step size is, and such that the higher the picture quality shown by the picture quality information is, the smaller the quantization step size is.

Therefore, according to the image encoding device 200, encoding can be performed such that the requested picture quality is maintained because quantization is performed by the quantization unit 145 using a step size designated to reflect the picture quality information acquired by the picture quality acquisition unit 211.

Second Embodiment

The following describes an image encoding system of a second embodiment of the present invention.

<Structure>

Figure 7:
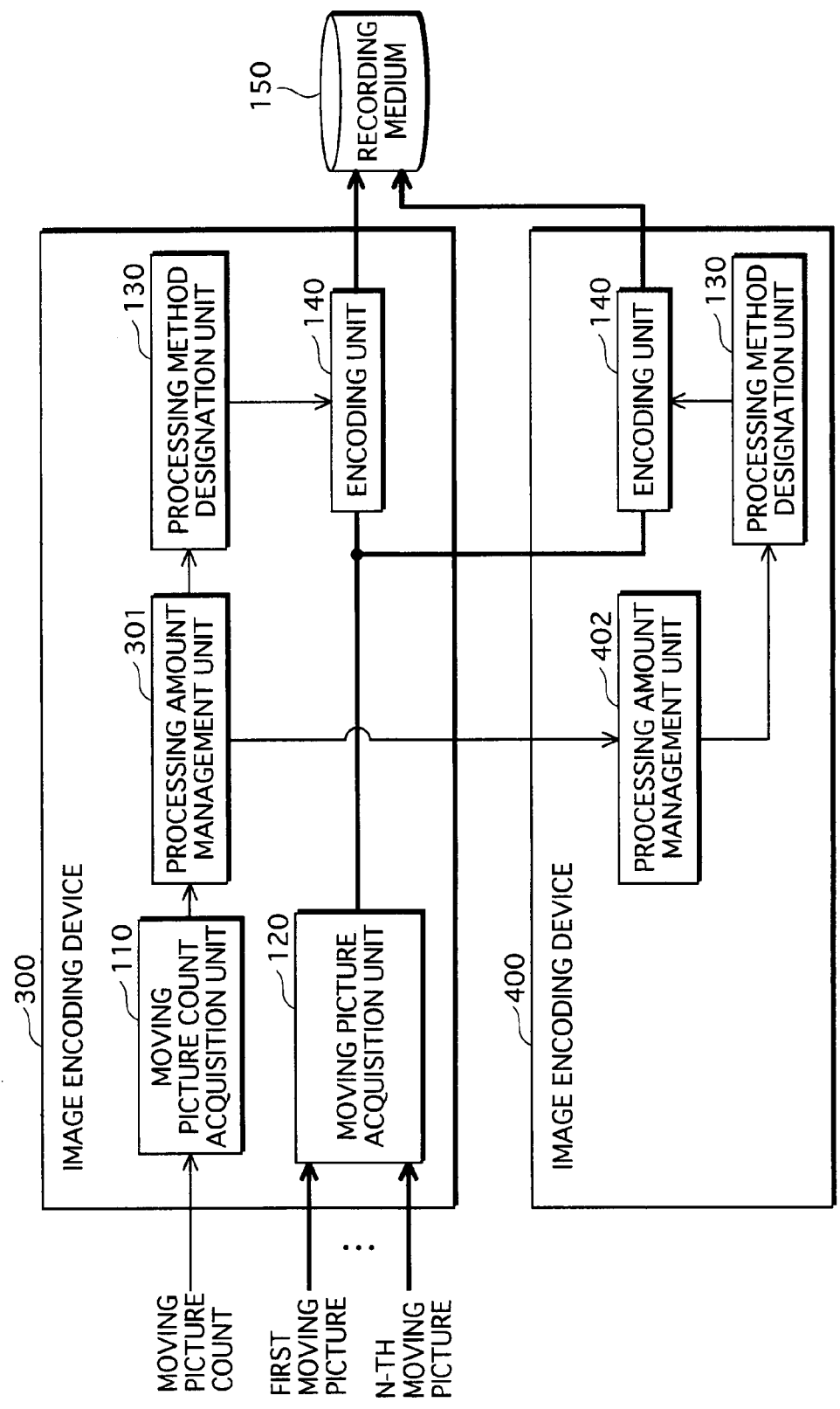
FIG. 7 is a structural diagram of an image encoding system of the second embodiment of the present invention.

FIG. 7 is a structural diagram of the image encoding system of the second embodiment of the present invention.

The image encoding system uses a plurality of image encoding devices to perform encoding processing of moving pictures according to distributed processing. As shown in FIG. 7, the image encoding system is composed of an image encoding device 300 and an image encoding device 400 connected via a network. The compositional elements of the image encoding devices 300 and 400 that are identical to the compositional elements of the image encoding device 100 shown in the first embodiment have the same numerical references thereas, and a detailed description thereof is omitted.

The image encoding device 300 acquires information showing the moving picture count and moving pictures from an external source, and delegates image encoding processing for one or more of the moving pictures to the image encoding device 400 while performing image encoding processing for the remaining moving pictures itself. The image encoding device 300 is composed of a moving picture count acquisition unit 110, a moving picture acquisition unit 120, a processing method designation unit 130, an encoding unit 140, and a processing amount management unit 301.

The image encoding processing 400 includes a processing method designation unit 130, an encoding unit 140 and a processing amount management unit 402.

The processing amount management unit 301 of the image encoding device 300 has a memory that stores in advance processing amount information showing the processing capability of the image encoding device 300. The processing amount management unit 301 has functions of inquiring to the image encoding device 400 about the processing capability thereof, obtaining a response, and determining how much encoding (i.e. the encoding of how many moving pictures) to delegate to the image encoding device 400. The processing amount management unit 301 makes this determination based on (a) the processing capability of the image encoding device 400, (b) information showing the moving picture count that has been acquired by the moving picture count acquisition unit 110 from an external source, and (c) the processing capability of the image encoding device 300. The processing amount management unit 301 also has a function of transferring, to the image encoding device 400, (a) information showing the number of moving pictures whose image encoding has been determined to be delegated to the image encoding device 400, and (b) from among the moving pictures acquired from an external source by the moving picture acquisition unit 102, moving pictures equivalent in number to the number whose encoding is delegated to the image encoding device 400. The remaining moving pictures are to be encoded in the image encoding device 300, and the processing amount management unit 301 further has a function of transferring a moving picture count showing the number of the remaining moving pictures to the processing method designation unit 130 in the image encoding device 300.

The processing amount management unit 402 of the image encoding device 400 has a memory that stores in advance the processing amount information that shows the processing capability of the image encoding device 400. The processing amount management unit 402 has a function of, when an inquiry regarding processing capability is received from the image encoding device 300, referring to the memory, and transmitting the processing amount information of the image encoding device 400 to the image encoding device 300. The processing amount management unit 402 also has a function of, when information showing a moving picture count is received from the image encoding device 300, transferring the received moving picture count to the processing method designation unit 130 of the image encoding device 400.

The processing amount information showing processing capability that is stored in each of the image encoding device 300 and the image encoding device 400 may, for instance, be expressed by a moving picture count that shows how many moving pictures can be encoded simultaneously when a predetermined encoding processing method is used uniformly for encoding of each one moving picture.

<Operations>

The following describes operations of the image encoding system having the described structure.

Upon receiving input of a plurality of moving pictures and the moving picture count from an external source, the image encoding device 300 executes delegation processing to delegate the encoding of one or more of the moving pictures to the image encoding device 400 and to perform encoding of the remaining one or more moving pictures itself.

Figure 8:
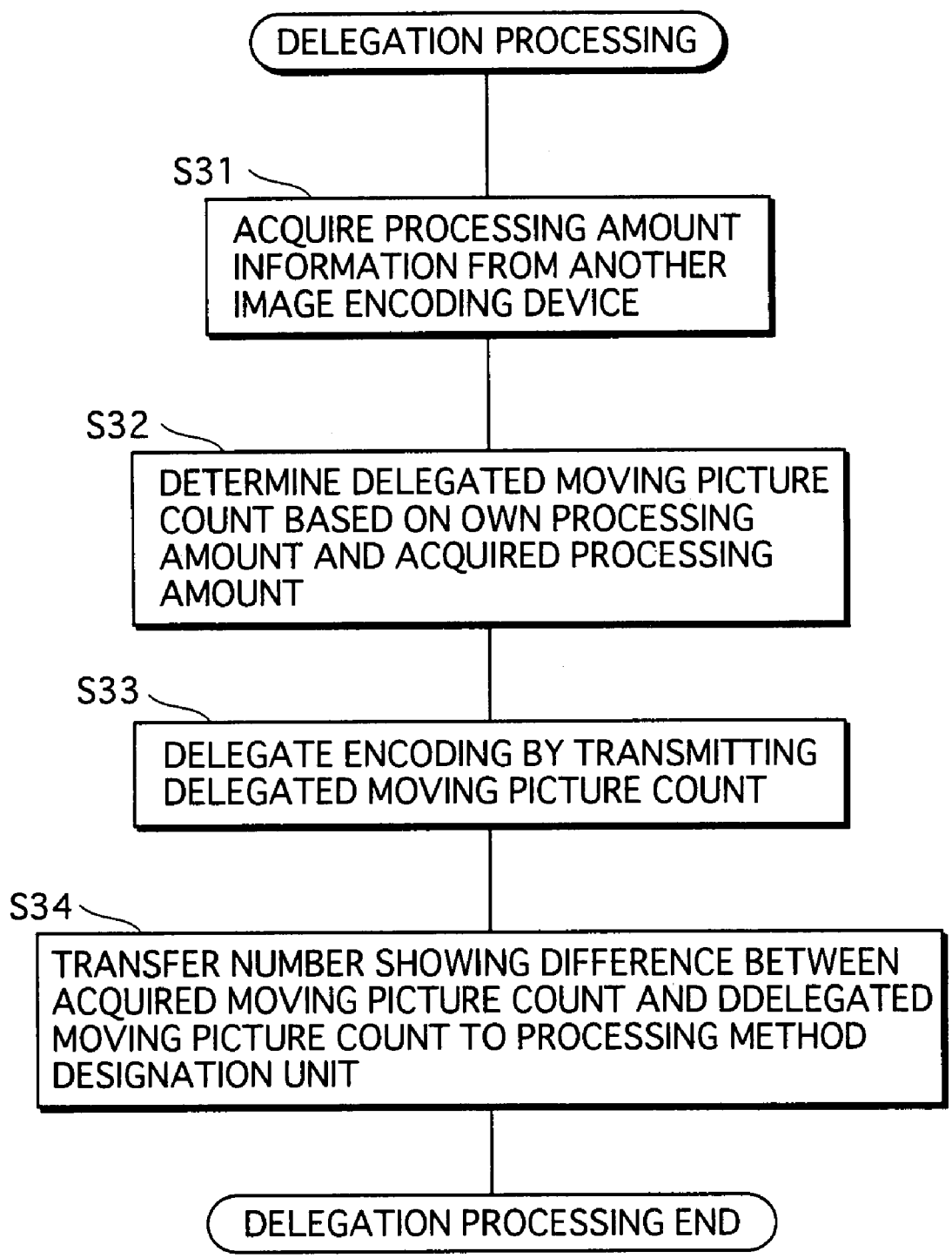
FIG. 8 is a flowchart showing delegation processing performed by an image encoding device 300.

FIG. 8 is a flowchart showing the delegation processing performed by the image encoding device 300. The following describes the operations of the image encoding device 300 in accordance with FIG. 8, and the operations of the image encoding device 400 in response to the operations of the image encoding device 300.

The image encoding device 300 makes an inquiry regarding processing capability to the image encoding device 400 connected via the network, and in response receives processing amount information transmitted by the image encoding device 400 (step S31).

The processing amount management unit 301 of the image encoding device 300 calculates the ratio of (a) the value of the processing capability shown by the received processing amount information, and (b) the value of the processing capability shown by the processing amount information of the image encoding device 300, and then calculates a closest integer to a value obtained by multiplying the calculated ratio with the moving picture count acquired by the moving picture count acquisition unit 110, and sets the integer as a delegated moving picture count showing the number of moving pictures whose encoding is to be delegated (step S32). The image encoding device then delegates the encoding by transmitting the delegated moving picture count to the image encoding device 400 (step S33).

As a result, the image encoding device 400 receives the delegated moving picture count, and the processing method designation unit 130 of the image encoding device 400 determines the processing methods for the image encoding processing in accordance with the delegated moving picture count. The encoding unit 140 of the image encoding device 400 receives the moving pictures equivalent in number to the delegated moving picture number from the image encoding device 300, and by time division executes encoding processing with respect to the received moving pictures in accordance with the processing methods designated by the processing method designation unit 130.

After step S33, the processing amount management unit 301 of the image encoding device 300 transmits, to the processing method designation unit 130 in the image encoding device 300, a moving picture count that is the difference between the moving picture count acquired by the moving picture count acquisition unit 110 and the delegated moving picture count, and ends the delegation processing (step S34). As a result of step S34, the processing methods for the encoding processing are designated by the processing method designation unit 130 of the image encoding device 300 in accordance with the moving picture count that is the difference, and the encoding unit 140 of the image encoding device 300 performs image encoding with respect to the number of moving pictures that are the difference, in accordance with the designated processing methods.

<Supplementary Remarks>

Although the image encoding device of the present invention has been described based on first and second embodiments, the following modifications are possible, and the present invention is by no means limited to the image encoding devices shown in the aforementioned embodiments.

(1) The recording medium 150 to which the image encoding devices shown in the first and second embodiments record moving pictures after encoding is not limited to being an optical disk such as a CD-ROM (Compact Disk Read Only Memory), a DVD (Digital Versatile Disk) or a BD (Blu-ray Disk), and may be a hard disk, a memory card or the like.

Alternatively, the output unit 147 of the image encoding device may output encoded moving pictures to a network instead of recording encoded moving pictures to a recording medium.

(2) Although the image encoding devices shown in the first and second embodiments encode in compliance with the MPEG4 AVC standard, they may comply with another standard such as the MPEG 2 video standard or the MPEG 4 visual standard. The present invention is not limited to being applied to any particular standard.

(3) The processing method designation unit shown in each of the first and second embodiments designates parameters for designating a motion estimation processing method, an intra-encoding processing method, a quantization processing method pertaining to quantization step size, and a variable length encoding processing method. In addition to designating these processing methods, the processing method designation unit may designate such that the encoding processing method is changed in a manner not shown in the first and second embodiments according to the moving picture count of encoding target moving pictures. For instance, if the moving picture count is equal to or greater than a predetermined number, such as 3, the processing method designation unit may designate such that only intra-encoding processing is performed, with motion estimation processing not being performed.

Conversely, the processing method designation unit and the encoding unit may be structured such that not all but only some of the motion estimation processing method, the intra-encoding processing method and the variable length encoding processing method are designated, and that only the parts of encoding processing relating to the designated processing methods are varied according to the encoding target moving picture count.

(4) The processing method designation unit in each of the image encoding devices shown in the first and second embodiments has a motion estimation method table and an intra-encoding processing method table, and designates the processing methods for motion estimation and intra-encoding in the encoding processing using these tables. The processing method designation unit may similarly designate the quantization processing method relating to the quantization step size and designate the variable length encoding processing method using lookup tables. Alternatively, the processing method designation unit may designate parameters showing the processing methods by performing computations based on predetermined expressions.

However, it is necessary for the processing methods to be designated such that the greater the encoding target moving picture count is, the smaller the processing amount per moving picture is in motion estimation processing, intra-encoding processing and variable length encoding processing. Furthermore, in order to suppress the drop in picture quality that occurs due to the reduction in processing amount, it is also necessary for the quantization step size to be designated so as to be smaller, the greater the encoding target moving picture count is.

(5) The quantization step size designation unit 233 in the encoding processing device shown in the modification example of the first embodiment designates the quantization step size based on the encoding target moving picture count and the picture quality information showing the requested picture quality. However, the quantization step size designation unit 233 may instead designate the quantization step size based solely on the picture quality information, without relying on the encoding target moving picture count.

(6) The specific contents of the processing method designation unit of each image encoding device shown in the first and second embodiment with use of FIG. 2 to FIG. 4 etc. designating the processing method according to the encoding processing target moving picture count are simply examples, and may vary according to factors such as the circuit structure and processing performance of the encoding unit.

To produce an image encoding device suitable to actual use, it is desirable to set the tables and arithmetic expressions used in the processing method designation unit to designate the processing methods based on either experiments or logical calculations in a manner that the processing methods are designated such that the speed of the encoding processing executed by the circuits in the encoding unit falls approximately into a set range regardless of the encoding target moving picture count.

(7) The function units that constitute the encoding processing unit in the image encoding devices shown in the first and second embodiments are not limited to being circuits made up only of hardware, but may include software, and their functions may be realized according to execution of the software. In this case, a processor that executes the software may be provided for each function unit respectively, or the functions corresponding to a plurality of the function units may be realized by a single processor.

Furthermore, the image encoding device may be partially or wholly realized by LSI (Large Scale Integration), VLSI (Very Large Scale Integration) or the like, a plurality of LSIs or the like, or one or a plurality of LSIs or the like in combination with other circuits.

(8) The moving picture count acquisition unit 110 in the image encoding device shown in the first embodiment may acquire the moving picture count at times after the commencement of encoding processing of moving pictures by the encoding unit 140. Here, the processing method designation unit 130 newly designates the processing methods when there has been a change in the moving picture count, and the encoding unit performs encoding in accordance with the newly designated processing methods.

This enables the present invention to deal with cases in which there is a change in the input moving picture count.

(9) As a modification of the image encoding device shown in the first embodiment, if circuits in the encoding unit 140 that can be used in decoding are put to use in decoding, and additional circuits necessary for decoding are further provided, the image encoding device can be further given a decoding function for decoding compressed moving pictures.

In this case, the processing method designation unit 130 may be modified in a manner that it designates the processing method such that the greater the amount of moving pictures that are decoded is, the less the computation amount for encoding is per moving picture.

(10) As a modification of the image encoding device 300 shown in the second embodiment, a function unit corresponding to the processing amount management unit 402 of the image encoding device 400 may be incorporated into the image encoding device 300 in addition to its original compositional elements. In addition to delegating encoding processing to the image encoding device 400, when requested by another image encoding device 300 to perform encoding processing, this modified image encoding device is capable of acquiring one or more moving pictures via its moving picture acquisition unit and encoding the acquired one or more moving pictures.

(11) As a modification of the image encoding system shown in the second embodiment, the processing method designation unit 130 may be omitted from the image encoding device 400, and in accordance with the moving picture count acquired by the moving picture count acquisition unit, the processing method designation unit 130 of the image encoding device 300 may designate the motion estimation processing method and the other processing methods to be used in encoding. Here, after determining how many moving pictures encoding is to be delegated to the image encoding device 400, the processing amount management unit 301 transfers the determined moving picture count and the processing methods designated by the processing method designation unit 130 to the image encoding device 400. The encoding unit 140 of the image processing device 400 performs encoding of moving pictures equivalent in number to the delegated moving picture count in accordance with the processing methods received from the image encoding device 300.

(12) A program that causes a processor to execute the processing in the image encoding device (see FIG. 4 and FIG. 5) may be distributed recorded on a recording medium or via any of various communication paths. Examples of such a recording medium include an IC card, a hard disk, an optical disk, a flexible disk and a ROM. The distributed program may be provided for use by being stored in a memory or the like that is readable by a processor, and the functions of the image encoding device shown in the first embodiment may be realized by the processor executing the program.

The image encoding device of the present invention can be used built in a hard disk recorder, a DVD recorder, or the like.

The invention claimed is:

1. An image encoding device that performs encoding processing that is for compressing one or more moving pictures and includes motion estimation processing, comprising:
    a moving picture count acquisition unit operable to acquire a moving picture count that indicates how many moving pictures are an encoding target;
    a moving picture acquisition unit operable to acquire one or plural moving pictures that are the encoding target;
    a motion estimation processing method designation unit operable to designate, in accordance with the acquired moving picture count, a motion estimation processing method that affects a computation amount in the motion estimation processing, such that the greater the moving picture count, the smaller the computation amount; and
    an encoding unit operable to perform encoding processing with respect to the acquired one or plural moving pictures, and in a case that the plural moving pictures are acquired, perform the encoding processing by time division, wherein
    the encoding unit includes a motion estimation sub-unit operable to perform, as part of the encoding processing, motion estimation processing using the designated motion estimation processing method, and wherein
    the motion estimation processing designation unit (a) includes a storage sub-unit operable to store in advance a table that associates a plurality of moving picture count values and parameters for designating the motion estimation processing method, the moving picture count values and the parameters being associated so as to have a relationship whereby the greater the moving picture count, the less the computation amount of the motion estimation processing, and (b) designates the motion estimation processing method by transferring, to the motion estimation sub-unit, a parameter that, among the parameters in the table, corresponds to the acquired moving picture count, and
    the motion estimation sub-unit performs the motion estimation processing using the designated motion estimation processing method, based on the parameter transferred from the motion estimation processing method designation unit.

2. An image encoding device that performs encoding processing that is for compressing one or more moving pictures and includes motion estimation processing, comprising:
a moving picture count acquisition unit operable to acquire a moving picture count that indicates how many moving pictures are an encoding target;
a moving picture acquisition unit operable to acquire one or plural moving pictures that are the encoding target;
a motion estimation processing method designation unit operable to designate, in accordance with the acquired moving picture count, a motion estimation processing method that affects a computation amount in the motion estimation processing, such that the greater the moving picture count, the smaller the computation amount; and
an encoding unit operable to perform encoding processing with respect to the acquired one or plural moving pictures, and in a case that the plural moving pictures are acquired, perform the encoding processing by time division, wherein
the encoding unit includes a motion estimation sub-unit operable to perform, as part of the encoding processing, motion estimation processing using the designated motion estimation processing method, and wherein
the motion estimation processing designation unit designates, in accordance with the acquired moving picture count, the motion estimation processing method in relation to an upper limit value of a total number of reference image frames in motion estimation processing, such that the greater the moving picture count, the smaller the upper limit value of the total number of reference frames, and
the motion estimation sub-unit, in the motion estimation processing performs, with respect to each of processing target blocks in each of image frames that are a target of the motion estimation processing, a search for a motion vector in a total number of reference image frames that is no greater than the upper limit value in the designated motion estimation processing method.

3. An image encoding device that performs encoding processing that is for compressing one or more moving pictures and includes motion estimation processing, comprising:
a moving picture count acquisition unit operable to acquire a moving picture count that indicates how many moving pictures are an encoding target;
a moving picture acquisition unit operable to acquire one or plural moving pictures that are the encoding target;
a motion estimation processing method designation unit operable to designate, in accordance with the acquired moving picture count, a motion estimation processing method that affects a computation amount in the motion estimation processing, such that the greater the moving picture count, the smaller the computation amount; and
an encoding unit operable to perform encoding processing with respect to the acquired one or plural moving pictures, and in a case that the plural moving pictures are acquired, perform the encoding processing by time division, wherein
the encoding unit includes a motion estimation sub-unit operable to perform, as part of the encoding processing, motion estimation processing using the designated motion estimation processing method, and wherein
the motion estimation processing method designation unit designates, in accordance with the acquired moving picture count, the motion estimation processing method in relation to a motion vector search range in the motion estimation search processing, such that the greater the moving picture count, the smaller the search range, and
the motion estimation sub-unit, with respect to each of processing target blocks in each of image frames that are a target of the motion estimation processing, searches within the search range in the designated motion estimation processing method for a reference image block that is similar to the processing target block, and determines a motion vector that indicates the reference image block.

4. An image encoding device that performs encoding processing that is for compressing one or more moving pictures and includes motion estimation processing, comprising:
a moving picture count acquisition unit operable to acquire a moving picture count that indicates how many moving pictures are an encoding target;
a moving picture acquisition unit operable to acquire one or plural moving pictures that are the encoding target;
a motion estimation processing method designation unit operable to designate, in accordance with the acquired moving picture count, a motion estimation processing method that affects a computation amount in the motion estimation processing, such that the greater the moving picture count, the smaller the computation amount; and
an encoding unit operable to perform encoding processing with respect to the acquired one or plural moving pictures, and in a case that the plural moving pictures are acquired, perform the encoding processing by time division, wherein
the encoding unit includes a motion estimation sub-unit operable to perform, as part of the encoding processing, motion estimation processing using the designated motion estimation processing method, and wherein
the motion estimation processing method designation unit designates, in accordance with the acquired moving picture count, the motion estimation processing method in relation to shape patterns of reference image blocks in motion estimation processing, such that the greater the moving picture count, the fewer the shape patterns, and
the motion estimation unit, with respect to each of processing target blocks in each of image frames that are a target of the motion estimation processing, uses the shape patterns in the designated motion estimation processing method to search for a reference image block similar to the processing target block, and determines a motion vector that indicates the reference image block.

5. An image encoding device that performs encoding processing that is for compressing one or more moving pictures and includes motion estimation processing, comprising:
a moving picture count acquisition unit operable to acquire a moving picture count that indicates how many moving pictures are an encoding target;
a moving picture acquisition unit operable to acquire one or plural moving pictures that are the encoding target;
a motion estimation processing method designation unit operable to designate, in accordance with the acquired moving picture count, a motion estimation processing method that affects a computation amount in the motion estimation processing, such that the greater the moving picture count, the smaller the computation amount; and
an encoding unit operable to perform encoding processing with respect to the acquired one or plural moving pictures, and in a case that the plural moving pictures are acquired, perform the encoding processing by time division, wherein
the encoding unit includes a motion estimation sub-unit operable to perform, as part of the encoding processing, motion estimation processing using the designated motion estimation processing method, and wherein the moving picture acquisition unit acquires a new moving picture while the encoding unit is performing the encoding, the moving picture count acquisition unit newly acquires the moving picture count while the encoding unit is performing the encoding, and the motion estimation processing designation unit newly designates the motion estimation processing method each time the moving picture count acquisition unit newly acquires the moving picture count.

6. An image encoding device that performs encoding processing that is for compressing one or more moving pictures and includes motion estimation processing, comprising:

a moving picture count acquisition unit operable to acquire a moving picture count that indicates how many moving pictures are an encoding target;

a moving picture acquisition unit operable to acquire one or plural moving pictures that are the encoding target;

a motion estimation processing method designation unit operable to designate, in accordance with the acquired moving picture count, a motion estimation processing method that affects a computation amount in the motion estimation processing, such that the greater the moving picture count, the smaller the computation amount; and an encoding unit operable to perform encoding processing with respect to the acquired one or plural moving pictures, and in a case that the plural moving pictures are acquired, perform the encoding processing by time division, wherein the encoding unit includes a motion estimation sub-unit operable to perform, as part of the encoding processing, motion estimation processing using the designated motion estimation processing method, wherein the moving picture acquisition unit acquires the plural moving pictures that are encoding targets, and the image encoding device further comprises:

a reception unit operable to receive, from an external device that is capable of executing encoding processing, capability information that indicates computation processing capability of the external device;

a determination unit operable to determine, based on the capability information, a moving picture count of encoding target moving pictures whose encoding is to be delegated to the external device, from among the acquired moving pictures; and a transmission unit operable to transmit, from among the acquired moving pictures, moving pictures equivalent in number to the moving picture count determined by the determination unit, and wherein the motion estimation processing method designation unit designates the motion estimation processing method in accordance with a difference between the moving picture count acquired by the moving picture count acquisition unit and the moving picture count determined by the determination unit, such that the greater the difference, the less the computation amount.

7. The image encoding device of claim 6, wherein the determination unit, based on the capability information, determines a motion estimation processing method to be used in encoding processing that is delegated to the external device, in addition to determining the moving picture count of moving pictures whose encoding is to be delegated to the external device, and the transmission unit further transmits, to the external device, information showing the motion estimation processing method determined by the determination unit.

8. An image encoding device that performs encoding processing that is for compressing one or more moving pictures and includes motion estimation processing, comprising:

a moving picture count acquisition unit operable to acquire a moving picture count that indicates how many moving pictures are an encoding target;

a moving picture acquisition unit operable to acquire one or plural moving pictures that are the encoding target;

a motion estimation processing method designation unit operable to designate, in accordance with the acquired moving picture count, a motion estimation processing method that affects a computation amount in the motion estimation processing, such that the greater the moving picture count, the smaller the computation amount; and an encoding unit operable to perform encoding processing with respect to the acquired one or plural moving pictures, and in a case that the plural moving pictures are acquired, perform the encoding processing by time division, wherein the encoding unit includes a motion estimation sub-unit operable to perform, as part of the encoding processing, motion estimation processing using the designated motion estimation processing method, and further comprising:

a quantization step size designation unit operable to designate a quantization step size in accordance with the acquired moving picture count, such that the greater the moving picture count, the smaller the quantization step size, and wherein the encoding unit includes a quantization sub-unit operable to perform quantization using the determined quantization step size to quantize difference data obtained as a result of the motion estimation processing.

9. An image encoding device that performs encoding processing for compressing one or more moving pictures, comprising:

a moving picture count acquisition unit operable to acquire a moving picture count that indicates how many moving pictures are an encoding target;

a moving picture acquisition unit operable to acquire one or plural moving pictures that are the encoding target;

a processing method designation unit operable to designate, in accordance with the acquired moving picture count, an encoding processing method that affects a computation amount in the encoding processing, such that the greater the moving picture count, the smaller the computation amount; and an encoding unit operable to perform the encoding processing with respect to the acquired one or plural moving pictures using the designated encoding processing method, and in a case that the plural moving picture being acquired, perform the encoding processing by time division, wherein the processing method designation unit (a) includes a storage sub-unit operable to store in advance a table that associates a plurality of moving picture count values and parameters for designating the encoding processing method, the moving picture count values and the parameters being associated so as to have a relationship whereby the greater the moving picture count, the less the computation amount of the encoding processing, and (b) designates the encoding processing method by transferring, to the encoding unit, a parameter that, among the parameters in the table, corresponds to the acquired moving picture count, and the encoding unit performs the encoding processing using the designated encoding processing method, based on the parameter transferred from the processing method designation unit.

10. An image encoding device that performs encoding processing for compressing one or more moving pictures, comprising:

a moving picture count acquisition unit operable to acquire a moving picture count that indicates how many moving pictures are an encoding target;

a moving picture acquisition unit operable to acquire one or plural moving pictures that are the encoding target;

a processing method designation unit operable to designate, in accordance with the acquired moving picture count, an encoding processing method that affects a computation amount in the encoding processing, such that the greater the moving picture count, the smaller the computation amount; and an encoding unit operable to perform the encoding processing with respect to the acquired one or plural moving pictures using the designated encoding processing method, and in a case that the plural moving picture being acquired, perform the encoding processing by time division, wherein the encoding unit includes an intra-encoding sub-unit operable to perform, as part of the encoding processing, image intra-frame encoding processing with respect to some or all image frames of the moving pictures that are the encoding target, the processing method designation unit designates, in accordance with the acquired moving picture count, the processing method in relation to directions in which to search for an estimation value in image intra-frame encoding, such that the greater the moving picture count, the fewer the search directions, and the intra-encoding specification unit, with respect to each of processing target blocks in an image frame, searches in each direction in the designated encoding processing method to search for an estimation value that is most similar to image data of the processing target block.

11. An image encoding device that performs encoding processing for compressing one or more moving pictures, comprising:

a moving picture count acquisition unit operable to acquire a moving picture count that indicates how many moving pictures are an encoding target;

a moving picture acquisition unit operable to acquire one or plural moving pictures that are the encoding target;

a processing method designation unit operable to designate, in accordance with the acquired moving picture count, an encoding processing method that affects a computation amount in the encoding processing, such that the greater the moving picture count, the smaller the computation amount; and an encoding unit operable to perform the encoding processing with respect to the acquired one or plural moving pictures using the designated encoding processing method, and in a case that the plural moving picture being acquired, perform the encoding processing by time division, wherein the processing method designation unit designates, in accordance with the acquired moving picture count, the encoding processing method in relation to whether or not to use inter-image frame encoding, such that inter-image frame encoding is used if the acquired moving picture count is fewer than a predetermined moving picture count, and inter-image frame encoding is not used if the acquired moving picture count is equal to or greater than the predetermined moving picture count, the encoding unit (a) performs inter-image frame encoding and intra-image frame encoding with respect to the moving pictures if the designated encoding processing method is the encoding processing method that uses inter-frame encoding, and (b) performs intra-image frame encoding with respect to the moving pictures, without performing inter-image frame encoding, if the designated encoding processing method is the encoding processing method that does not use inter-image frame encoding.

12. An image encoding device that performs encoding processing for compressing one or more moving pictures, comprising:

a moving picture count acquisition unit operable to acquire a moving picture count that indicates how many moving pictures are an encoding target;

a moving picture acquisition unit operable to acquire one or plural moving pictures that are the encoding target;

a processing method designation unit operable to designate, in accordance with the acquired moving picture count, an encoding processing method that affects a computation amount in the encoding processing, such that the greater the moving picture count, the smaller the computation amount; and an encoding unit operable to perform the encoding processing with respect to the acquired one or plural moving pictures using the designated encoding processing method, and in a case that the plural moving picture being acquired, perform the encoding processing by time division, wherein the encoding unit includes a variable length encoding sub-unit operable to perform variable length encoding as part of the encoding processing, the processing method designation unit designates, in accordance with the acquired moving picture count, a variable length processing method such that arithmetic coding is used if the acquired moving picture count is fewer than the predetermined moving picture count, and arithmetic coding is not used if the acquired moving picture count is equal to or greater than the predetermined moving picture count, and the variable length encoding sub-unit (a) performs the variable length encoding using arithmetic coding if the designated variable length encoding method is the variable length encoding method that uses arithmetic coding, and (b) performs the variable length encoding using a comparative table of predetermined code words, without using arithmetic coding, if the designated variable length encoding method is the variable length encoding method that does not use arithmetic coding.

13. An image encoding device that performs encoding processing for compressing one or more moving pictures, comprising:

a moving picture count acquisition unit operable to acquire a moving picture count that indicates how many moving pictures are an encoding target;

a moving picture acquisition unit operable to acquire one or plural moving pictures that are the encoding target;

a processing method designation unit operable to designate, in accordance with the acquired moving picture count, an encoding processing method that affects a computation amount in the encoding processing, such that the greater the moving picture count, the smaller the computation amount; and an encoding unit operable to perform the encoding processing with respect to the acquired one or plural moving pictures using the designated encoding processing method, and in a case that the plural moving picture being acquired, perform the encoding processing by time division, wherein the moving picture acquisition unit acquires a new moving picture while the encoding unit is performing the encoding, the moving picture count acquisition unit newly acquires the moving picture count while the encoding unit is performing the encoding, and the processing method designation unit newly designates the encoding processing method each time the moving picture count acquisition unit newly acquires the moving picture count.

14. An image encoding device that performs encoding processing for compressing one or more moving pictures, comprising:

a moving picture count acquisition unit operable to acquire a moving picture count that indicates how many moving pictures are an encoding target;

a moving picture acquisition unit operable to acquire one or plural moving pictures that are the encoding target;

a processing method designation unit operable to designate, in accordance with the acquired moving picture count, an encoding processing method that affects a computation amount in the encoding processing, such that the greater the moving picture count, the smaller the computation amount; and an encoding unit operable to perform the encoding processing with respect to the acquired one or plural moving pictures using the designated encoding processing method, and in a case that the plural moving picture being acquired, perform the encoding processing by time division, wherein the moving picture acquisition unit acquires the plural moving pictures that are encoding targets, and the image encoding device further comprises:

a reception unit operable to receive, from an external device that is capable of executing encoding processing, capability information that indicates computation processing capability of the external device;

a determination unit operable to determine, based on the capability information, a moving picture count of moving pictures whose encoding is to be delegated to the external device, from among the acquired moving pictures; and a transmission unit operable to transmit, from among the acquired moving pictures, moving pictures equivalent in number to the moving picture count determined by the determination unit, and wherein the processing method designation unit designates the encoding processing method in accordance with a difference between the moving picture count acquired by the moving picture count acquisition unit and the moving picture count determined by the determination unit, such that the greater the difference, the less the computation amount.

15. An image encoding device that performs encoding processing for compressing one or more moving pictures, comprising:

a moving picture count acquisition unit operable to acquire a moving picture count that indicates how many moving pictures are an encoding target;

a moving picture acquisition unit operable to acquire one or plural moving pictures that are the encoding target;

a processing method designation unit operable to designate, in accordance with the acquired moving picture count, an encoding processing method that affects a computation amount in the encoding processing, such that the greater the moving picture count, the smaller the computation amount is; and an encoding unit operable to perform the encoding processing with respect to the acquired one or plural moving pictures using the designated encoding processing method, and in a case that the plural moving picture being acquired, perform the encoding processing by time division, further comprising:

a picture quality information acquisition unit operable to acquire picture quality information showing a requested picture quality, wherein the processing method designation unit designates the encoding processing method in accordance with the acquired motion picture count and the acquired picture quality information.

16. An image encoding device that performs encoding processing for compressing one or more moving pictures, comprising:

a moving picture count acquisition unit operable to acquire a moving picture count that indicates how many moving pictures are an encoding target;

a moving picture acquisition unit operable to acquire one or plural moving pictures that are the encoding target;

a processing method designation unit operable to designate, in accordance with the acquired moving picture count, an encoding processing method that affects a computation amount in the encoding processing, such that the greater the moving picture count, the smaller the computation amount; and an encoding unit operable to perform the encoding processing with respect to the acquired one or plural moving pictures using the designated encoding processing method, and in a case that the plural moving picture being acquired, perform the encoding processing by time division, further comprising:

a decoding unit operable to decode a compressed moving picture, using part of circuits of the encoding unit, wherein the processing method designation unit designates the encoding processing method further in accordance with an amount of the moving picture to be decoded by the decoding unit, such that the greater the amount of the moving picture, the less the computation amount.

17. An image encoding method that performs encoding processing that is for compressing one or more moving pictures and includes motion estimation processing, comprising:

a moving picture count acquisition step of acquiring a moving picture count that indicates how many moving pictures are an encoding target;

a moving picture acquisition step of acquiring one or plural moving pictures that are the encoding target;

a motion estimation processing method designation step of designating, in accordance with the acquired moving picture count, a motion estimation processing method that affects a computation amount in the motion estimation processing, such that the greater the moving picture count, the smaller the computation amount; and an encoding step of performing encoding processing with respect to the acquired one or plural moving pictures, and in a case that the plural moving pictures are acquired, performing the encoding processing by time division, wherein the encoding step includes a motion estimation sub-step of performing, as part of the encoding processing, motion estimation processing using the designated motion estimation processing method and wherein the motion estimation processing method designation step (a) includes a storage step of storing in advance a table that associates a plurality of moving picture count values and parameters for designating the motion estimation processing method, the moving picture count values and the parameters being associated so as to have a relationship whereby the greater the moving picture count, the less the computation amount of the motion estimation processing, and (b) designating the motion estimation processing method by transferring, to the motion estimation sub-step, a parameter that, among the parameters in the table, corresponds to the acquired moving picture count, and the motion estimation sub-step performs the motion estimation processing using the designated motion estimation processing method, based on the parameter transferred from the motion estimation processing method designation step.

18. An image encoding method that performs encoding processing for compressing one or more moving pictures, comprising:

a moving picture count acquisition step of acquiring a moving picture count that indicates how many moving pictures are an encoding target;

a moving picture acquisition step of acquiring one or plural moving pictures that are the encoding target;

a processing method designation step of designating, in accordance with the acquired moving picture count, an encoding processing method that affects a computation amount in the encoding processing, such that the greater the moving picture count, the smaller the computation amount; and an encoding step of performing the encoding processing with respect to the acquired one or plural moving pictures using the designated encoding processing method, and in a case that the plural moving pictures are acquired, performing the encoding processing by time division, wherein the processing method designation step (a) includes a storage step of storing in advance a table that associates a plurality of moving picture count values and parameters for designating the encoding processing method, the moving picture count values and the parameters being associated so as to have a relationship whereby the greater the moving picture count, the less the computation amount of the encoding processing, and (b) designating the encoding processing method by transferring, to the encoding step, a parameter that, among the parameters in the table, corresponds to the acquired moving picture count, and the encoding step performs the encoding processing using the designated encoding processing method based on the parameter transferred from the processing method designation step.

19. A non-transitory computer-readable recording medium storing a control program that causes encoding control processing for compressing one or more moving pictures to be executed by an device that is capable of executing a computer program, the encoding control processing comprising:

a moving picture count acquisition step of acquiring a moving picture count that indicates how many moving pictures are an encoding target;

a moving picture acquisition step of acquiring one or plural moving pictures that are the encoding target;

a motion estimation processing method designation step of designating, in accordance with the acquired moving picture count, a motion estimation processing method that affects a computation amount in the motion estimation processing, such that the greater the moving picture count, the smaller the computation amount; and an encoding step of performing encoding processing with respect to the acquired one or plural moving pictures, and in a case that the plural moving pictures are acquired, performing the encoding processing by time division, wherein the encoding step includes a motion estimation sub-step of performing, as part of the encoding processing, motion estimation processing using the designated motion estimation processing method, and wherein the motion estimation processing method designation step (a) includes a storage step of storing in advance a table that associates a plurality of moving picture count values and parameters for designating the motion estimation processing method, the moving picture count values and the parameters being associated so as to have a relationship whereby the greater the moving picture count, the less the computation amount of the motion estimation processing, and (b) designating the motion estimation processing method by transferring, to the motion estimation sub-step, a parameter that, among the parameters in the table, corresponds to the acquired moving picture count, and the motion estimation sub-step performs the motion estimation processing using the designated motion estimation processing method, based on the parameter transferred from the motion estimation processing method designation step.

20. A non-transitory computer-readable recording medium storing a control program that causes encoding control processing for compressing one or more moving pictures to be executed by an device that is capable of executing a computer program, the encoding control processing comprising:

a moving picture count acquisition step of acquiring a moving picture count that indicates how many moving pictures are an encoding target;

a moving picture acquisition step of acquiring one or plural moving pictures that are the encoding target;

a processing method designation step of designating, in accordance with the acquired moving picture count, an encoding processing method that affects a computation amount in the encoding processing, such that the greater the moving picture count, the smaller the computation amount; and an encoding step of performing the encoding processing with respect to the acquired one or plural moving pictures using the designated encoding processing method, and in a case that the plural moving pictures are acquired, performing the encoding processing by time division, wherein the processing method designation step (a) includes a storage step of storing in advance a table that associates a plurality of moving picture count values and parameters for designating the encoding processing method, the moving picture count values and the parameters being associated so as to have a relationship whereby the greater the moving picture count, the less the computation amount of the encoding processing, and (b) designating the encoding processing method by transferring, to the encoding step, a parameter that, among the parameters in the table, corresponds to the acquired moving picture count, and the encoding step performs the encoding processing using the designated encoding processing method, based on the parameter transferred from the processing method designation step.

* * * * *